United States Patent [19]

Matsui

[11] Patent Number: 5,539,900

[45] Date of Patent: Jul. 23, 1996

[54] INFORMATION PROCESSING SYSTEM

[75] Inventor: Satoshi Matsui, Yokohama, Japan

[73] Assignee: Fujitsu Limited, Kawasaki, Japan

[21] Appl. No.: 224,682

[22] Filed: Apr. 7, 1994

Related U.S. Application Data

[63] Continuation of Ser. No. 637,130, Jan. 3, 1991, abandoned.

[30] Foreign Application Priority Data

Jan. 6, 1990 [JP] Japan ............................................. 2-813

[51] Int. Cl.[6] .............................. G06F 9/00; G06F 13/00
[52] U.S. Cl. ...................... 395/500; 395/375; 364/259.6;
364/269.9; 364/239.8
[58] Field of Search ..................................... 395/375, 500,
395/325

[56]  References Cited

U.S. PATENT DOCUMENTS

| | | | |
|---|---|---|---|
| 3,676,852 | 7/1972 | Abernathy et al. | 395/375 |
| 4,967,346 | 10/1990 | Freidin | 395/500 |
| 5,036,458 | 7/1991 | Matsushima et al. | 395/775 |
| 5,041,968 | 8/1991 | Yamaguchi | 395/800 |
| 5,056,004 | 10/1991 | Ohde et al. | 395/375 |
| 5,109,332 | 4/1992 | Culley | 395/325 |
| 5,193,157 | 3/1993 | Barbour et al. | 395/375 |

FOREIGN PATENT DOCUMENTS

0369407  5/1990  European Pat. Off. .

*Primary Examiner*—Kevin J. Teska
*Assistant Examiner*—Ayni Mohamed
*Attorney, Agent, or Firm*—Staas & Halsey

[57]   ABSTRACT

An information processing system includes an instruction decoder part for decoding an external instruction signal and for outputting a control signal for executing an instruction based on a decoded result, and an operation part for carrying out an operation based on the control signal and for outputting an operation result. The operation part includes an operation unit which carries out an arithmetic logic operation and outputs the operation result, a flag register for holding states related to the operation result based on the control signal, and a buffer for successively holding predetermined states related to the operation result. The operation unit carries out the arithmetic logic operation by selectively reading the states held in the flag register and the buffer.

11 Claims, 4 Drawing Sheets

FIG.1 PRIOR ART

FIG.3 ns. Recently, with the improved performance of computer systems, various information processing systems, which carry out the same operation as the low level equipment in response to the same instruction, have been developed. These recently developed information processing systems will be referred to as high level equipment. In other words, the high level equipment realizes the improved functions by carrying out complex operations and processing, and for example, the instruction set is extended by adding new instructions while including the same instructions used in the low level equipment.

However, when the instruction set is modified in order to realize the improved functions, the software which operates in the low level equipment may not operate in the high level equipment. For example, this situation is encountered when an instruction with which the flags for holding results of various operations do not change in the low level equipment changes to an instruction with which the flags change in the high level equipment. In such a case, there is a possibility that the software which is developed up to that time become useless.

In addition, when the emphasis is placed on compatibility of the instructions with the low level equipment by considering the effective use of the conventional software, it is impossible to make an extensive modification. As a result, it is difficult to realize improved functions and improved performance of the high level equipment. Furthermore, the development of the high level equipment lacks flexibility when the modification is restricted.

Accordingly, it is necessary to ensure compatibility of the instructions with the low level equipments when the instruction with which the flags do not change in the low level equipment changes to an instruction with which the flags change in the high level equipment by modification of the instruction set, for example.

Figure 1:
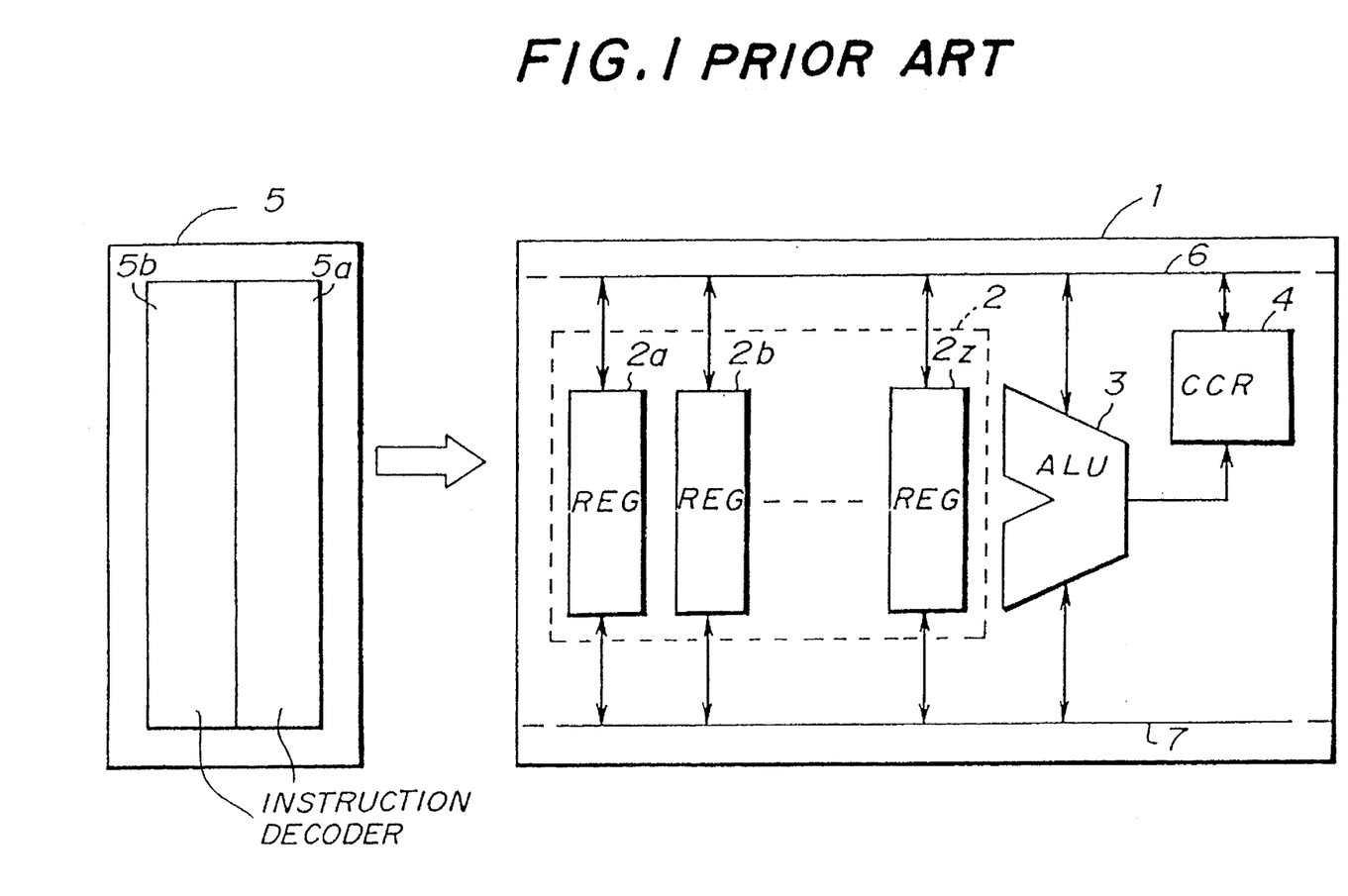
FIG. 1 is a system block diagram showing an example of a conventional information processing system.

FIG. 1 generally shows an example of a conventional information processing system. FIG. 1 shows the general structure within a microprocessor unit (MPU). An execution unit 1 functions as an operation means, and a register group 2 is made up of registers 2a, 2b, . . . , and 2z. An arithmetic logic unit (ALU) 3 functions as an operation unit for carrying out arithmetic logic operations, and a condition code register (CCR) 4 has 8 bits for storing flags indicative of states related to an operation result. An instruction decoder part 5 is made up of two instruction decoders 5a and 5b and functions as a control means. The register group 2, the ALU 3 and the CCR 4 are coupled via a data bus 6 and an address bus 7.

When developing high level equipment with respect to low level equipment in such an information processing system, the processing performance is improved by extending the instruction set, for example. The instruction set is extended by adding new instructions while including the same instructions used in the low level equipment. When actually extending the instruction set, an instruction with which the flags for holding results of various operations do not change in the low level equipment may change to an instruction with which the flags change in the high level equipment in order to realize improved functions and cope with a change in the needs. In such a case, the software compatibility cannot be maintained if the low level equipment and the high level equipment carry out different operations in response to the same instruction. Hence, the instruction decoder part 5 is formed by the two instruction decoders 5a and 5b. The compatibility of the high level equipment with the low level equipment is ensured by forming from one instruction an instruction with which the flags do not change in the instruction decoder 5a an instruction with which the flags change in the instruction decoder 5b.

Next, a description will be given of a case where the instruction with which the flags do not change in the low level equipment is modified into the instruction with which the flags change in order to realize the improved functions and cope with the change in the needs.

First, an external instruction signal is decoded in the instruction decoder part 5, and a control signal which is generated based on the decoded result is supplied to the execution unit 1 via an MPU bus (not shown). In the instruction decoder part 5, the instruction decoder 5a generates a control signal with which the flags do not change and the instruction decoder 5b generates a control signal with which the flags change. One of the control signals is selectively supplied to the execution unit 1 based on the external instruction signal. In the execution unit 1, the ALU 3 carries out arithmetic operations or logic operations based on the control signal from the instruction decoder part 5. The data which is output from the ALU 3 is stored in the register 2a which is used as an accumulator. The states related to the operation result in the ALU 3 are stored in the CCR 4.

Accordingly, two instructions, that is, the control signal with which the flags do not change and the control signal with which the flags change are generated within the instruction decoder part 5. Since one of the two control signals is selectively supplied to the execution unit 1, the high level equipment becomes compatible with the low level equipment.

However, in the conventional information processing system described above, it is necessary to provide the two instruction decoders 5a and 5b in the instruction decoder part 5 in order to maintain compatibility of the high level equipment with the low level equipment when the instruction with which the flags do not change in the low level equipment is modified into the instruction with which the flags change in the high level equipment. In other words, the scale of the hardware increases because of the need to provide the two instruction decoders 5a and 5b in the instruction decoder part 5. Therefore, there are problems in that it is difficult to reduce the cost and size of of the information processing system.

SUMMARY OF THE INVENTION

Accordingly, it is a general object of the present invention to provide a novel and useful information processing system in which the problems described above are eliminated.

Another and more specific object of the present invention is to provide an information processing system comprising instruction decoder means for decoding an external instruction signal and for outputting a control signal for executing an instruction based on a decoded result, and operation means coupled to the instruction decoder means for carrying out an operation based on the control signal and for outputting an operation result. The operation means includes an operation unit when carries out an arithmetic logic operation and outputs the operation result, first holding means for holding states related to the operation result based on the control signal, and second holding means for successively holding predetermined states related to the operation result, and the operation unit carries out the arithmetic logic operation by selectively reading the states held in the first and second holding means. According to the information processing system of the present invention, it is possible to maintain compatibility of the high level equipment with the low level equipment, without considerably increasing the cost and size of the system because the instruction decoder means does not require large hardware.

Other objects and further features of the present invention will be apparent from the following detailed description when read in conjunction with the accompanying drawings.

DESCRIPTION OF THE PREFERRED EMBODIMENTS

Figure 2:
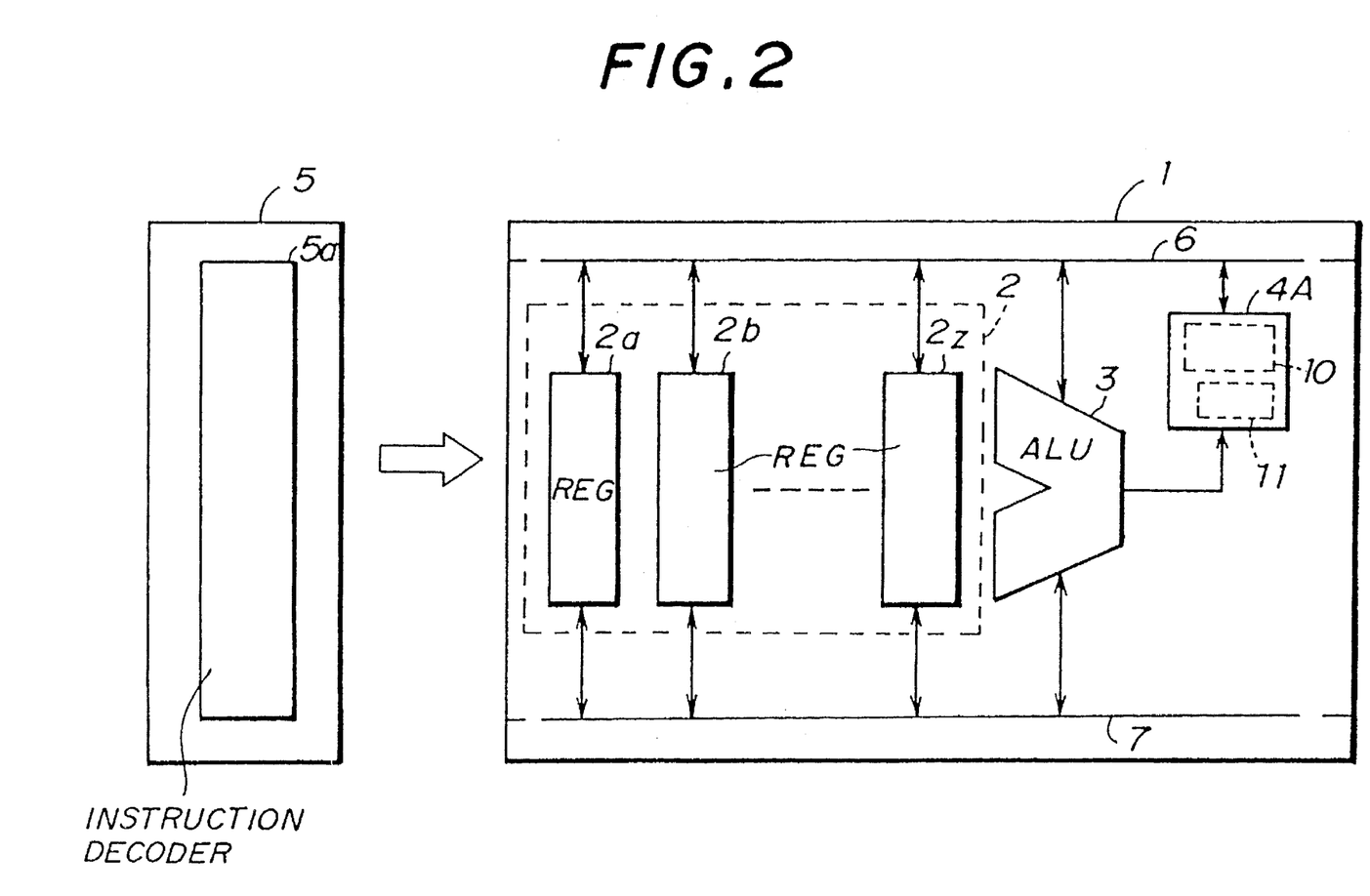
FIG. 2 is a system block diagram showing an embodiment of an information processing system according to the present invention.

FIG. 2 shows an embodiment of an information processing system according to the present invention. In FIG. 2, those parts which are essentially the same as those corresponding parts in FIG. 1 are designated by the same reference numerals, and a description thereof will be omitted.

This embodiment differs from the conventional information processing system shown in FIG. 1, in that the instruction decoder part 5 of this embodiment is made up of one instruction decoder 5a, and that a flag register (first holding means) 10 and a buffer (second holding means) 11 are provided within a CCR 4A which is used as an operation auxiliary unit.

Figure 3:
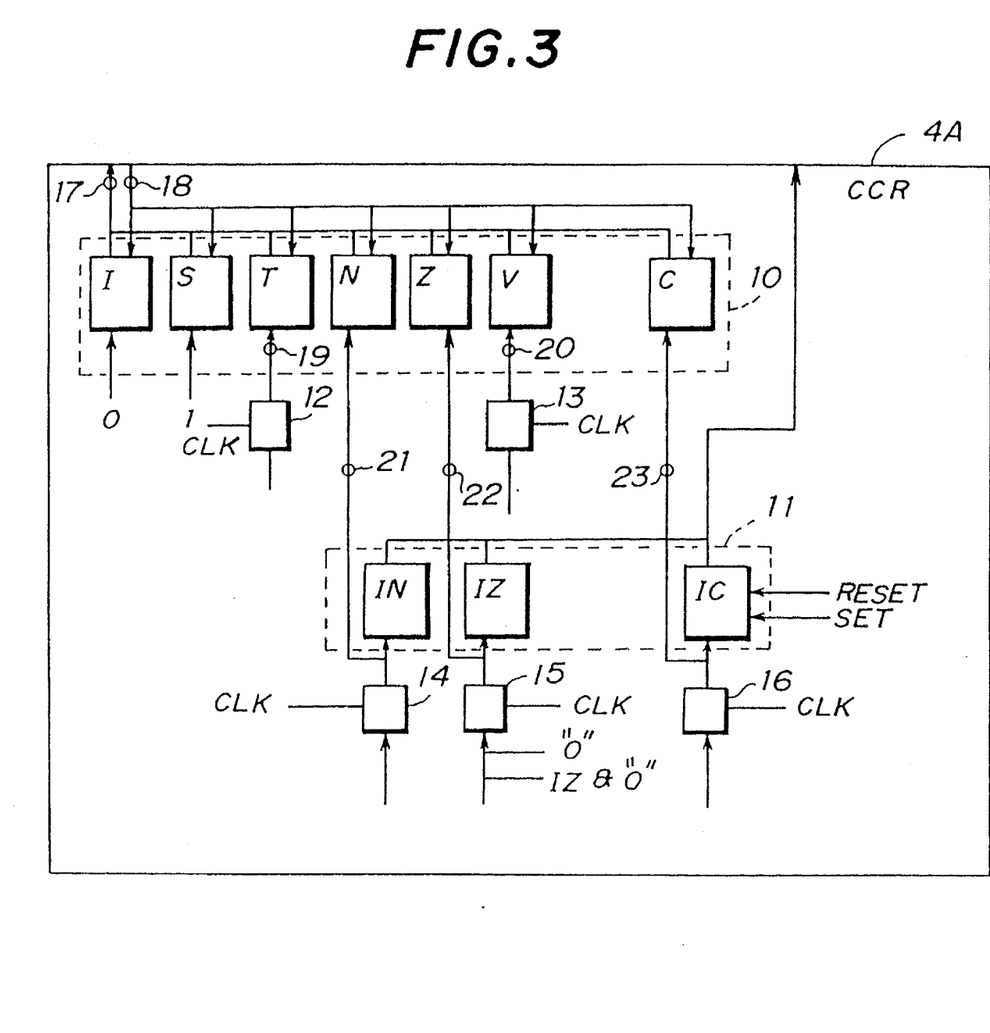
FIG. 3 is a system block diagram showing an embodiment of a CCR of the embodiment shown in FIG. 2.

FIG. 3 shows an embodiment of the CCR 4A shown in FIG. 2. The CCR 4A includes a flag register 10, a buffer 11, latch circuits 12 through 16, and switches 17 through 23 which are connected as shown. The flag register 10 includes a carry flag C which is set when a carry/borrow occurs at the most significant bit (MSB) of an operation result when an operation is carried out, an overflow flag V which is set when an overflow occurs by carrying out an operation, a zero flag Z which is set when an operation result becomes all "0", a negative flag N which is set when the MSB of an operation result is "1", a sticky bit flag T which is set when one or more "1"s exist in a data which is shifted out by a carry by executing a right shift instruction, a stuff flag S which is set depending on a stuff utilization state, and an interrupt enable flag I which changes depending on an interrupt utilization state.

The buffer 11 includes an internal negative flag IN which has a function similar to that of the negative flag N, an internal zero flag IZ which has a function similar to that of the zero flag Z, and an internal carry flag IC which has a function similar to that of the carry flag C.

The latch circuits 12 through 16 respectively hold the data on the data bus 6 for a predetermined time, that is, until a next clock CLK is generated. The switches 17 through 23 respectively turn ON/OFF (connect/disconnect) the signal link in response to a predetermined control signal. For example, the switches 17 and 18 are turned ON/OFF in response to PUSH and POP instructions or the like so that the flag register 10 can be freely utilized by the user.

Next, a description will be given of the compatibility of the high level equipment with the low level equipment for the case where the instruction with which the flags do not change in the low level equipment is modified into the instruction with which the flags change in the high level equipment in order to improve the functions and cope with the change in the needs.

First, the external instruction signal is temporarily stored in an instruction register (not shown) by an instruction fetch. The instruction in the instruction register is decoded in the instruction decoder part 5 with a predetermined timing, and a control signal which is generated based on the decoded result is supplied to the execution unit 1 via the MPU bus (not shown).

The control signal from the instruction decoder part 5 is supplied to the ALU 3 within the execution unit 1, and the ALU 3 carries out arithmetic operations or logic operations. The data or operation result from the ALU 3 is stored in the register 2a which is used as the accumulator. In addition, the states related to result of the arithmetic operation or logic operation carried out by the ALU 3 are stored in the CCR 4A.

When one of the negative flag N, the zero flag Z and the carry flag C changes depending on the states related to the operation result of the ALU 3, the states of the negative flag N, the zero flag Z and the carry flag C in the CCR 4A are normally kept as they are. Instead of the flags N, Z and C, the states of the internal negative flag IN, the internal zero flag IZ and the internal carry flag IC within the buffer 11 change. In other words, the internal flags IN, IZ and IC function as if they are the flags N, Z and C and store the states related to the result of the arithmetic operation or logic operation carried out by the ALU 3.

In the case where the content of the control signal supplied to the ALU 3 is an instruction with which the flags do not change in the low level equipment, the switches 18 and 21 through 23 are turned OFF based on the control signal so that the states related to the operation result and required for the operation process in the ALU 3 are stored in the internal flags IN, IZ and IC of the buffer 11. That is, in the case of the instruction with which the flags do not change, the states of the negative flag N, the zero flag Z and the carry flag C do not change when viewed by the user, and the operation can be carried out by reading the states related to the operation result and required for the operation process from the internal flags IN, IZ and IC in response to a request from the ALU 3.

On the other hand, in the case of the instruction with which the flags change only in the high level equipment, one of the switches 21 through 23 corresponding to the flag which changes is turned ON based on the control signal, and the same content as one of the internal negative flag IN, the internal zero flag IZ and the internal carry flag IC corresponding to the turned ON switch is stored in the corresponding one of the negative flag N, the zero flag Z and the carry flag C. In other words, in the case of the instruction with which the flags change, the states of the negative flag N, the zero flag Z and the carry flag C change when viewed by the user, and the states related to the operation result and required for the operation process can be read out from the internal flags IN, IZ and IC in response to the request from the ALU 3 similarly as in the case where the flags do not change.

Accordingly, the buffer 11 is regarded as if it were the flag register 11, and the two states which are the state in which the flags change and the state in which the flags do not change are generated within the CCR 4A. For this reason, it is possible to reduce the size of the instruction decoder part 5 which has a large hardware structure when compared to that of the buffer 11, and as a result the size of the entire information processing system can be reduced.

On the other hand, the buffer 11 may be used as a temporary register in addition to being used for storing the states related to the operation result of the ALU 3 as a substitute for the flag register 10. The temporary register is used to store an intermediate operation result when the arithmetic operation carried out in the ALU 3 exceeds the maximum processing bit length of the ALU 3. Particularly, when the ALU 3 has a maximum processing bit length of 16 bits but the ALU 3 carries out an operation having a bit length of 32 bits, for example, the ALU 3 must carry out the operation in two 16-bit processes. In order to carry out the second 16-bit process after the first 16-bit process, it is necessary to store the states related to the operation result of the first 16-bit process.

When the buffer 11 is used as the temporary register, the states related to the operating result of the first 16-bit process are stored in the buffer 11. The states related to the final operation result which is obtained based on the resulting state of the first 16-bit process stored in the buffer 11 and the resulting state of the second 16-bit process are stored in the flag register 10. In other words, a 32-bit process (operation) becomes possible by storing the states related to the operation result of the first 16-bit process in the buffer 11 and reading these states into the ALU 3. Therefore, it becomes possible to carry out an operation which exceeds the maximum processing bit length of the ALU 3 by using the buffer 11 as the temporary register.

In the described embodiment, the buffer 11 is provided within the CCR 4A. However, it is of course possible to provide the buffer 11 outside the CCR 4A within the execution unit 1.

Figure 4:
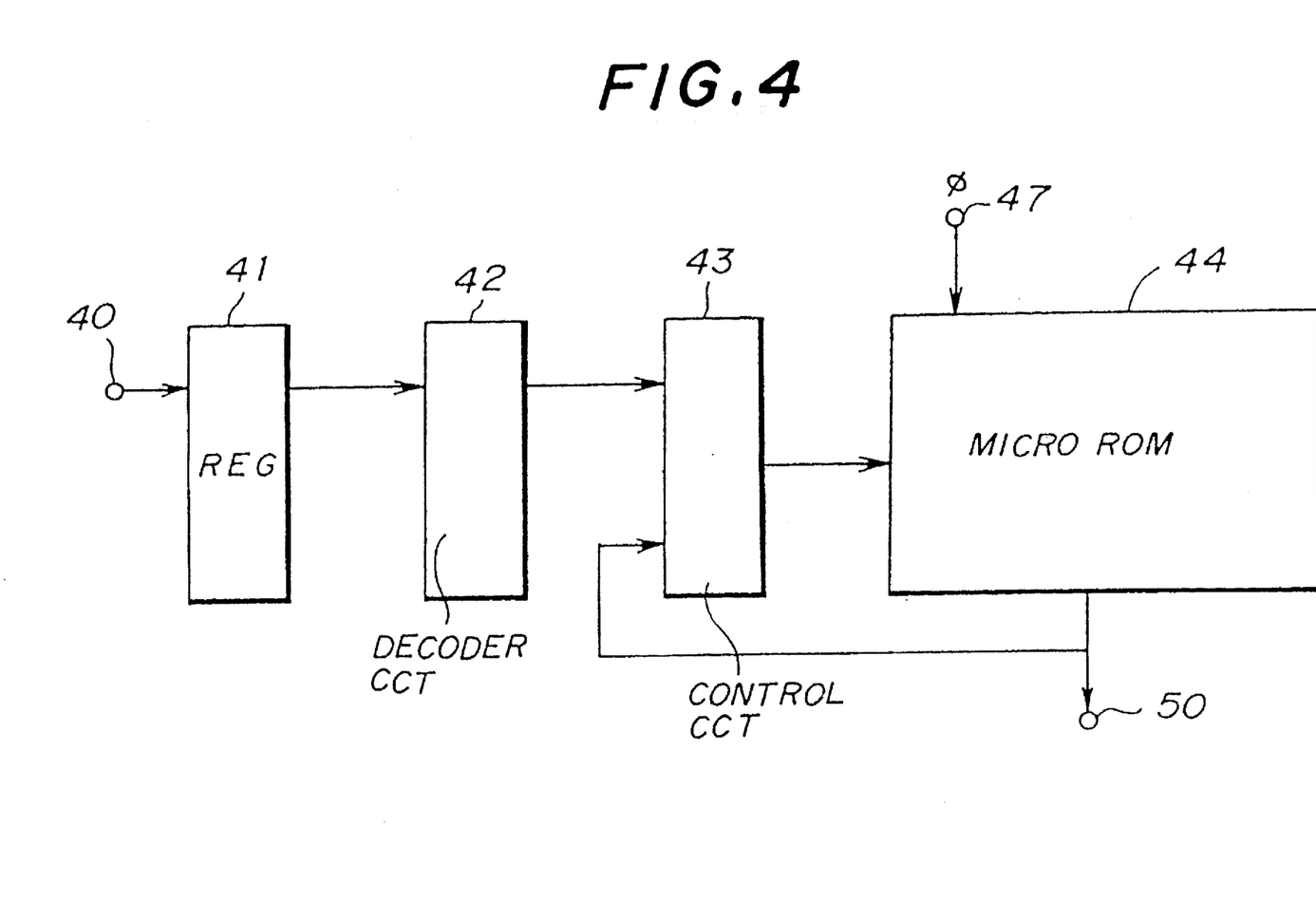
FIG. 4 is a system block diagram showing an embodiment of an instruction decoder of the embodiment shown in FIG. 2.

FIG. 4 shows an embodiment of the instruction decoder 5a shown in FIG. 2. The instruction decoder 5a includes an instruction register 41, a decoder circuit 42, a control circuit 43, and a micro read only memory (ROM) 44 which are connected as shown. The external instruction signal is temporarily stored in the instruction register 41 via a terminal 40, and the decoder circuit 42 decodes the external instruction signal which is stored in the instruction register 11. The control circuit 43 accesses the micro ROM 44 in response to an output of the decoder circuit 42. The micro ROM 44 prestores details of various information such as the kind of operation and the storage location of each operation result. The control signal for executing the instruction is read out from the micro ROM 44 and is supplied to the execution unit 1 shown in FIG. 2 via a terminal 50. In FIG. 4, a clock signal $\phi$ is supplied to the micro ROM 44 via a terminal 47.

Further, the present invention is not limited to these embodiments, but various variations and modifications may be made without departing from the scope of the present invention.

What is claimed is:

1. An information processing system for providing compatibility between high level equipment and low level equipment comprising:

instruction decoder means for decoding an instruction signal and for outputting a control signal for executing an instruction based on a decoded result; and operation means coupled to said instruction decoder means for carrying out an operation based on the control signal, said operation means comprises:

said operation unit which carries out an arithmetic logic operation and outputs data, first holding means for holding first states based on said control signal, and second holding means for holding second states based on said control signal which is identical to the control signal based on which said first holding means holds the first states, the first states being mutually different from the second states, said operation unit carrying out the arithmetic logic operation by selectively reading the first and second states held in said first and second holding means to provide compatibility between the high level equipment and the low level equipment, and said first states remain unchanged in said first holding means and said second states change only in said second holding means when the instruction is executed on low level equipment but both said first states and said second states change in both said first and second holding means when the same instruction is executed on high level equipment.

2. An information processing system for providing compatibility between high level equipment and low level equipment comprising:

instruction decoder means for decoding an instruction signal and for outputting a control signal for executing an instruction based on a decoded result; and operation means coupled to said instruction decoder means for carrying out an operation used on the control signal, said operation means including:

an operation unit which carries out an arithmetic logic operation and outputs data, first holding means for holding first states based on the control signal, and second holding means for holding second states based on said control signal, the first states being mutually different from the second states, said operation unit carrying out the arithmetic logic operation by selectively reading the first and second states held in said first and second holding means to provide compatibility between the high level equipment and the low level equipment, said first states remain unchanged in said first holding means and said second states change only in said second holding means when the instruction is executed on low level equipment but both said first states and said second states change in both said first and second holding means when the same instruction is executed on high level equipment, and said second states held in said second holding means include at least one of flags selected from a group consisting of an internal carry flag which is set when a carry/borrow occurs at a most significant bit of data when operation is carried out, an internal zero flag which is set when data becomes all "0" and an internal negative flag which is set when most significant bit of data is "1".

3. An information processing system for providing compatibility between high level equipment and low level equipment comprising:

instruction decoder means for decoding an instruction signal and for outputting a control signal for executing an instruction based on a decoded result; and operation means coupled to said instruction decoder means for carrying out an operation based on the control signal, said operation means including:

an operation unit which carries out an arithmetic logic operation and outputs data, first holding means for holding first states based on the control signal, and second holding means for holding second states based on said control signal, the first states being mutually different from the second states, said operation unit carrying out the arithmetic logic operation by selectively reading the first and second states held in said first and second holding means to provide compatibility between the high level equipment and the low level equipment, said first states remain unchanged in said first holding means and said second states change only in said second holding means when the instruction is executed on low level equipment but both said first states and said second states change in both said first and second holding means when the same instruction is executed on high level equipment, and said first states held in said first holding means include a carry fag which is set when a carry/borrow occurs at a most significant bit of the data when operation is carried out, an overflow flag which is set when an overflow occurs by carrying out operation, a zero flag which is set when data becomes all "0", a negative flag which is set when most significant bit of data is "1", a sticky bit flag which is set when one or more "1"s exist in data which is shifted out by a carry by executing a right shift instruction, stuff flag which is set depending on a stuff utilization state, and an interrupt enable flag which changes depending on an interrupt utilization state, and said second states held in said second holding means include at least one of flags selected from a group consisting of an internal carry flag which is set when carry/borrow occurs at most significant bit of data when operation is carried out, an internal zero flag which is set when data becomes all "0" and an internal negative flag which is set when most significant bit of data is "1".

4. An information processing system for providing compatibility between high level equipment and low level equipment comprising:

instruction decoder means for decoding an instruction signal and for outputting a control signal for executing an instruction based on a decoded result; and operation means coupled to said instruction decoder means for carrying out an operation based on the control signal, said operation means including:

an operation unit which carries out an arithmetic logic operation and outputs data, first holding means for holding first states based on the control signal, and second holding means for holding second states based on said control signal, the first states being mutually different from the second states, said operation unit carrying out the arithmetic logic operation by selectively reading the first and second states held in said first and second holding means to provide compatibility between the high level equipment and the low level equipment, said first states remain unchanged in said first holding means and said second states change only in said second holding means when the instruction is executed on low level equipment but both said first states and said second states change in both said first and second holding means when the same instruction is executed on high level equipment, said first holding means comprises a flag register for storing first flags indicative of the first states, said second holding means comprises a buffer for storing second flags indicative of the second states, and said operation means further includes switching means for selectively coupling said flag register and said buffer depending on the control signal, said switching means disconnecting said flag register and said buffer to store in said buffer the second flags which are required for an operation process in said operation unit when the second flags do not change for the instruction executed in low level equipment and connecting said flag register and said buffer to store in both said flag register and said buffer at least one of second flags when at least one of the second flags changes only for the instruction executed in high level equipment.

5. The information processing system as claimed in claim 4, wherein said buffer also stores intermediate results of operation carried out in said operation unit when a number of bits of the operation exceeds a maximum processing bit length of the operation unit.

6. The information processing system as claimed in claim 4, wherein said operation means further comprises an operation auxiliary unit, said operation auxiliary unit including said flag register and said buffer.

7. An information processing system comprising:

instruction decoder means for decoding an instruction signal and for outputting a control signal for executing an instruction based on a decoded result; and operation means coupled to said instruction decoder means for carrying out an operation based on the control signal, wherein said operation means including an operation unit which carries out an arithmetic logic operation, first holding means for holding first states based on the control signal, and second holding means for holding second states based on the control signal, said first states remaining the same in said first holding means and said second states capable of changing in said second holding means when the instruction is executed on low level equipment, said first and second states capable of changing when the same instruction is executed on high level equipment, and said operation unit carries out the arithmetic logic operation by selectively reading the first and second states held in said first and second holding means.

8. An information processing system comprising:

instruction decoder means for decoding an instruction signal and for outputting a control signal for executing an instruction based on a decoded result; and operation means coupled to said instruction decoder means for carrying out an operation based on the control signal, said operation means including an operation unit which carries out an arithmetic logic operation and outputs data, first holding means for holding first states based on the control signal, and second holding means for holding second states based on the control signal, said operation unit carrying out the arithmetic logic operation by selectively reading the first and second states held in said first and second holding means, and said first holding means comprises a flag register for storing first flags indicative of the first states, said second holding means comprises a buffer for storing second flags indicative of the second state, and said operation means further includes switching means for selectively coupling said flag register and said buffer depending on the control signal, said switching means disconnecting said flag register and said buffer to store in said buffer the second flags which are required for an operation process in said operation unit when the second flags do not change for the instruction executed in low level equipment and connecting said flag register and said buffer to store in both said flag register and said buffer at least one of second flags when at least one of the second flags changes only for the instruction executed in high level equipment.

9. The information processing system as claimed in claim 8, wherein said buffer also stores intermediate results of operation carried out in said operation unit when a number of bits of the operation exceeds a maximum processing bit length of the operation unit.

10. The information processing system as claimed in claim 8, wherein said operation means further comprises an operation auxiliary unit, said operation auxiliary unit including said flag register and said buffer.

11. The information processing system as claimed in claim 1, wherein said first holding means and said second holding means are coupled in parallel to said operation unit.

* * * * *

UNITED STATES PATENT AND TRADEMARK OFFICE
CERTIFICATE OF CORRECTION

PATENT NO. : 5,539,900
DATED : July 23, 1996
INVENTOR(S) : Satoshi MATSUI

It is certified that error appears in the above-indentified patent and that said Letters Patent is hereby corrected as shown below:

Title Page, FOREIGN PATENT DOCUMENTS, insert --0173383 3/1986 European Patent Office--.

Coloumn 1, lines 10-11, change "micropro-cessing" to read -- microprocessor --.

Col. 6, line 44, change "used" to --based--.

Signed and Sealed this

Twenty-ninth Day of October 1996

Attest:

BRUCE LEHMAN

*Attesting Officer*  *Commissioner of Patents and Trademarks*